US012292789B2

(12) United States Patent
Guthrie

(10) Patent No.: US 12,292,789 B2
(45) Date of Patent: May 6, 2025

(54) SYSTEMS AND METHODS FOR INTELLIGENT COLLECTION AND SELECTIVE SHARING OF ASSET INVENTORY OVER A MANAGED SERVICES PLATFORM

(71) Applicant: CDW LLC, Vernon Hills, IL (US)

(72) Inventor: Jeremy Guthrie, Fitchburg, WI (US)

(73) Assignee: CDW LLC, Vernon Hills, IL (US)

( * ) Notice: Subject to any disclaimer, the term of this patent is extended or adjusted under 35 U.S.C. 154(b) by 90 days.

(21) Appl. No.: 18/230,521

(22) Filed: Aug. 4, 2023

(65) Prior Publication Data

US 2025/0045147 A1    Feb. 6, 2025

(51) Int. Cl.
*G06F 11/07* (2006.01)
*G06F 9/455* (2018.01)
*G06F 9/54* (2006.01)
*H04L 9/40* (2022.01)
*H04L 43/04* (2022.01)

(52) U.S. Cl.
CPC ...... *G06F 11/0793* (2013.01); *G06F 9/45504* (2013.01); *G06F 9/541* (2013.01); *H04L 43/04* (2013.01); *H04L 63/0428* (2013.01)

(58) Field of Classification Search
CPC .. G06F 11/0793; G06F 9/45504; G06F 9/541; H04L 43/04; H04L 63/0428
USPC .......................................................... 714/1
See application file for complete search history.

(56) References Cited

U.S. PATENT DOCUMENTS

| | | | |
|---|---|---|---|
| 11,362,889 B2 * | 6/2022 | Guthrie | H04L 63/0272 |
| 2014/0196140 A1 | 7/2014 | Gong | |
| 2015/0339784 A1 | 11/2015 | Bao et al. | |
| 2017/0195289 A1 | 7/2017 | Sun et al. | |
| 2019/0104158 A1 | 4/2019 | Banerjee et al. | |
| 2021/0392136 A1 | 12/2021 | Modi et al. | |
| 2023/0091953 A1 | 3/2023 | Dahlberg et al. | |
| 2023/0097884 A1 | 3/2023 | Walther et al. | |
| 2023/0244813 A1 | 8/2023 | Mehta et al. | |

OTHER PUBLICATIONS

Internation Patent Applicaiton No. PCT/US2024/040310, International Search Report and Written Opinion, mailing date of Nov. 13, 2024.

\* cited by examiner

*Primary Examiner* — Yair Leibovich
(74) *Attorney, Agent, or Firm* — MARSHALL, GERSTEIN & BORUN LLP; Randall G. Rueth

(57) ABSTRACT

A computer-implemented method for intelligent collection and selective sharing of information technology asset inventory over a managed services platform is disclosed herein. An exemplary method may include receiving, from a customer, a selection of one or more information technology services of an information technology service provider. The exemplary method may further include receiving, via a network tunnel between a machine avatar in a computing environment and a base management node, network traffic of the customer addressed to the one or more information technology services; and storing a portion of the network traffic. The exemplary method may further include generating a service notification for the customer based on the portion of the network traffic; and transmitting the service notification to the machine avatar through the network tunnel.

20 Claims, 5 Drawing Sheets

SYSTEMS AND METHODS FOR INTELLIGENT COLLECTION AND SELECTIVE SHARING OF ASSET INVENTORY OVER A MANAGED SERVICES PLATFORM

FIELD OF THE DISCLOSURE

The present disclosure generally relates to systems and methods for automated information technology (IT) services management, and in particular, for intelligent collection and selective sharing of asset inventory over a managed services platform.

BACKGROUND

The background description provided herein is for generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Information technology (IT) includes the use of computers to store, transmit, and/or process information. IT is a critical component of most businesses in today's Internet-based economy. Traditionally, management and delivery of IT services has required IT services companies to physically manage business equipment (e.g., computers, telephones, mobile devices, software, data, etc.). For example, IT service providers have required direct physical access to their customers' respective computing environments. Physical access has generally required that 1) customer business equipment be positioned at a site remote from the customer's business (e.g., at the service provider's data center or the data center of a third party) and/or that 2) customers allow service providers physical access to customer business equipment on the premises of the customer. The physical access requirements have wasted time and resources of the IT service provider and the customer alike.

However, prior conventional techniques to facilitate remote administration of IT services have focused on an ad-hoc approach, and have been limited in scope/applicability. Such conventional techniques have encountered numerous issues, including difficult installation/operation/updating, a lack of self-servicing, a lack of data sharing transparency, high cost, a lack of scalability, and overall inflexibility. Modern IT infrastructures are complex, heterogeneous computing environments, with complex networking capabilities. Yet existing approaches to facilitating remote administration of IT services lack a consistent, scalable framework.

Therefore, flexible and consistent methods and systems for intelligent collection and selective sharing of asset inventory over a managed services platform are needed, to reduce servicing issues, costs, and risks to IT service providers and customers, and to increase overall productivity, security, and connectivity.

BRIEF SUMMARY

This Brief Summary is provided to introduce a selection of concepts that are further described below in the Detailed Description in a simplified form. This Brief Summary is not intended to identify key features or essential features of the claimed subject matter, nor is it intended to be used to limit the scope of the claimed subject matter.

Generally speaking, the systems and methods of the present disclosure are related to intelligent collection and selective sharing of asset inventory over a managed services platform. This collection and sharing is accomplished through a base management node (BMN) that is connected to a machine avatar in a customer computing environment via a network tunnel. The BMN may collect data from the customer's computing environment, such as service provider preferences, information technology service preferences, and data sharing preferences, and the BMN may store this information. The BMN may then share the information with internal entities (e.g., users with access to the customer's instance of the BMN) and/or information technology service providers, in accordance with the customer's sharing preferences. As a result of this collection and sharing, the BMN may proactively update customers on the status of their information technology services/devices (e.g., via service notifications), connect customers with live agents to discuss various options related to their information technology services/devices, and/or provide relevant information to information technology service providers.

In one embodiment, a computer-implemented method for intelligent collection and selective sharing of information technology asset inventory over a managed services platform may include: receiving, from a customer, a selection of one or more information technology services of an information technology service provider; receiving, via a network tunnel between a machine avatar in a computing environment and a base management node, network traffic of the customer addressed to the one or more information technology services; storing, by one or more processors, a portion of the network traffic; generating, by the one or more processors, a service notification for the customer based on the portion of the network traffic; and transmitting, by the one or more processors, the service notification to the machine avatar through the network tunnel.

In a variation of this embodiment, the computer-implemented method may further comprise: receiving, from the customer, a second selection of one or more sharing preferences for data corresponding to the one or more information technology services; and sharing, by the one or more processors, the portion of the network traffic in accordance with the one or more sharing preferences. Further in this variation, the information technology service provider may be one of a plurality of information technology service providers, and the computer-implemented method may further comprise: determining, by the one or more processors based on the second selection, that the customer authorizes sharing the data corresponding to the one or more information technology services with two or more information technology service providers of the plurality of information technology service providers; and sharing, by the one or more processors utilizing two or more application programming interfaces (APIs), the data corresponding to the one or more information technology services with the two or more information technology service providers, wherein each API of the two or more APIs is associated with a respective information technology service provider of the two or more information technology service providers.

In another variation of this embodiment, the computer-implemented method may further comprise: encrypting, by the one or more processors executing an encryption algorithm, the portion of the network traffic; receiving, at the one or more processors, a data request from the information technology service provider; determining, by the one or more processors, that the portion of the network traffic should be shared with the information technology service provider based on the one or more sharing preferences; decrypting, by the one or more processors executing the encryption algorithm, the portion of the network traffic; and transmitting, by the one or more processors, the portion of the network traffic to the information technology service provider.

In yet another variation of this embodiment, the computer-implemented method may further comprise: receiving, at the one or more processors, information technology services data from the information technology service provider; standardizing, by the one or more processors executing a standardization algorithm, the information technology services data; and storing, by the one or more processors, the information technology services data into one or more standardized information technology services data files on the base management node. Further in this variation, the computer-implemented method may further comprise: receiving, at the one or more processors, a data request from the customer across the network tunnel; determining, by the one or more processors executing the standardization algorithm, at least one of the one or more standardized information technology services data files referenced by the data request; and retrieving, by the one or more processors, standardized information technology services data from the at least one of the one or more standardized information technology services data files.

In still another variation of this embodiment, the computer-implemented method may further comprise: generating, by the one or more processors, a proactive notification for the customer based on the portion of the network traffic, the proactive notification having a timed transmission threshold; and responsive to determining that the timed transmission threshold is satisfied, transmitting, by the one or more processors, the proactive notification to the machine avatar through the network tunnel.

In yet another variation of this embodiment, the computer-implemented method may further comprise: transmitting, by the one or more processors, the service notification to an internal workstation; and connecting, by the one or more processors, a user device associated with the computing environment to the internal workstation via the network tunnel.

In still another variation of this embodiment, the computer-implemented method may further comprise: initializing, by the one or more processors, the machine avatar in the computing environment by analyzing the one or more information technology services; establishing, by the one or more processors, the network tunnel between the machine avatar and the base management node; receiving, by the one or more processors, an information technology service provider information request from a user device associated with the computing environment; and transmitting, by the one or more processors across the network tunnel, information technology services data indicating at least the one or more information technology services of the information technology service provider.

In yet another variation of this embodiment, the computer-implemented method may further comprise: receiving, at the one or more processors, a subscription request corresponding to a licensed asset; provisioning, by the one or more processors based on the subscription request, an instance of the licensed asset; and providing, via the network tunnel, the customer with access to the instance of the licensed asset.

In still another variation of this embodiment, the machine avatar of the customer may include a virtual machine, and the computer-implemented method may further comprise: generating the virtual machine and a virtual network interface corresponding to the machine avatar, wherein generating the virtual machine includes deploying the virtual machine in a cloud computing platform.

In another embodiment, a computing system comprises: one or more processors; and a memory storing instructions that, when executed by the one or more processors, cause the computing system to: receive, from a customer, a selection of one or more information technology services of an information technology service provider, receive, via a network tunnel between a machine avatar in a computing environment and a base management node, network traffic of the customer addressed to the one or more information technology services, store a portion of the network traffic, generate a service notification for the customer based on the portion of the network traffic, and transmit the service notification to the machine avatar through the network tunnel.

In a variation of this embodiment, the instructions, when executed, may further cause the computing system to: receive, from the customer, a second selection of one or more sharing preferences for data corresponding to the one or more information technology services; and share the portion of the network traffic in accordance with the one or more sharing preferences.

In another variation of this embodiment, the information technology service provider may be one of a plurality of information technology service providers, and the instructions, when executed, may further cause the computing system to: determine, based on the second selection, that the customer authorizes sharing the data corresponding to the one or more information technology services with two or more information technology service providers of the plurality of information technology service providers; and share, by utilizing two or more application programming interfaces (APIs), the data corresponding to the one or more information technology services with the two or more information technology service providers, wherein each API of the two or more APIs is associated with a respective information technology service provider of the two or more information technology service providers.

In yet another variation of this embodiment, the instructions, when executed, may further cause the computing system to: encrypt, by executing an encryption algorithm, the portion of the network traffic; receive a data request from the information technology service provider; determine that the portion of the network traffic should be shared with the information technology service provider based on the one or more sharing preferences; decrypt, by executing the encryption algorithm, the portion of the network traffic; and transmit the portion of the network traffic to the information technology service provider.

In still another variation of this embodiment, the instructions, when executed, may further cause the computing system to: receive information technology services data from the information technology service provider; standardize, by executing a standardization algorithm, the information technology services data; store the information technology services data into one or more standardized information technology services data files on the base management node; receive a data request from the customer across the network tunnel; determine, by executing the standardization algorithm, at least one of the one or more standardized information technology services data files referenced by the data request; and retrieve standardized information technology services data from the at least one of the one or more standardized information technology services data files.

In yet another variation of this embodiment, the instructions, when executed, may further cause the computing system to: generating, by the one or more processors, a proactive notification for the customer based on the portion of the network traffic, the proactive notification having a timed transmission threshold; and responsive to determining that the timed transmission threshold is satisfied, transmitting, by the one or more processors, the proactive notification to the machine avatar through the network tunnel.

In still another variation of this embodiment, the instructions, when executed, may further cause the computing system to: transmit the service notification to an internal workstation; and connect a user device associated with the computing environment to the internal workstation via the network tunnel.

In yet another variation of this embodiment, the instructions, when executed, may further cause the computing system to: initialize the machine avatar in the computing environment by analyzing the one or more information technology services; establish the network tunnel between the machine avatar and the base management node; receive an information technology service provider information request from a user device associated with the computing environment; and transmit, across the network tunnel, information technology services data indicating at least the one or more information technology services of the information technology service provider.

In yet another embodiment, a non-transitory computer readable medium containing program instructions that, when executed, may cause a computer to: receive, from a customer, a selection of one or more information technology services of an information technology service provider; receive, via a network tunnel between a machine avatar in a computing environment and a base management node, network traffic of the customer addressed to the one or more information technology services; store a portion of the network traffic; generate a service notification for the customer based on the portion of the network traffic; and transmit the service notification to the machine avatar through the network tunnel.

DETAILED DESCRIPTION

Figure 1:
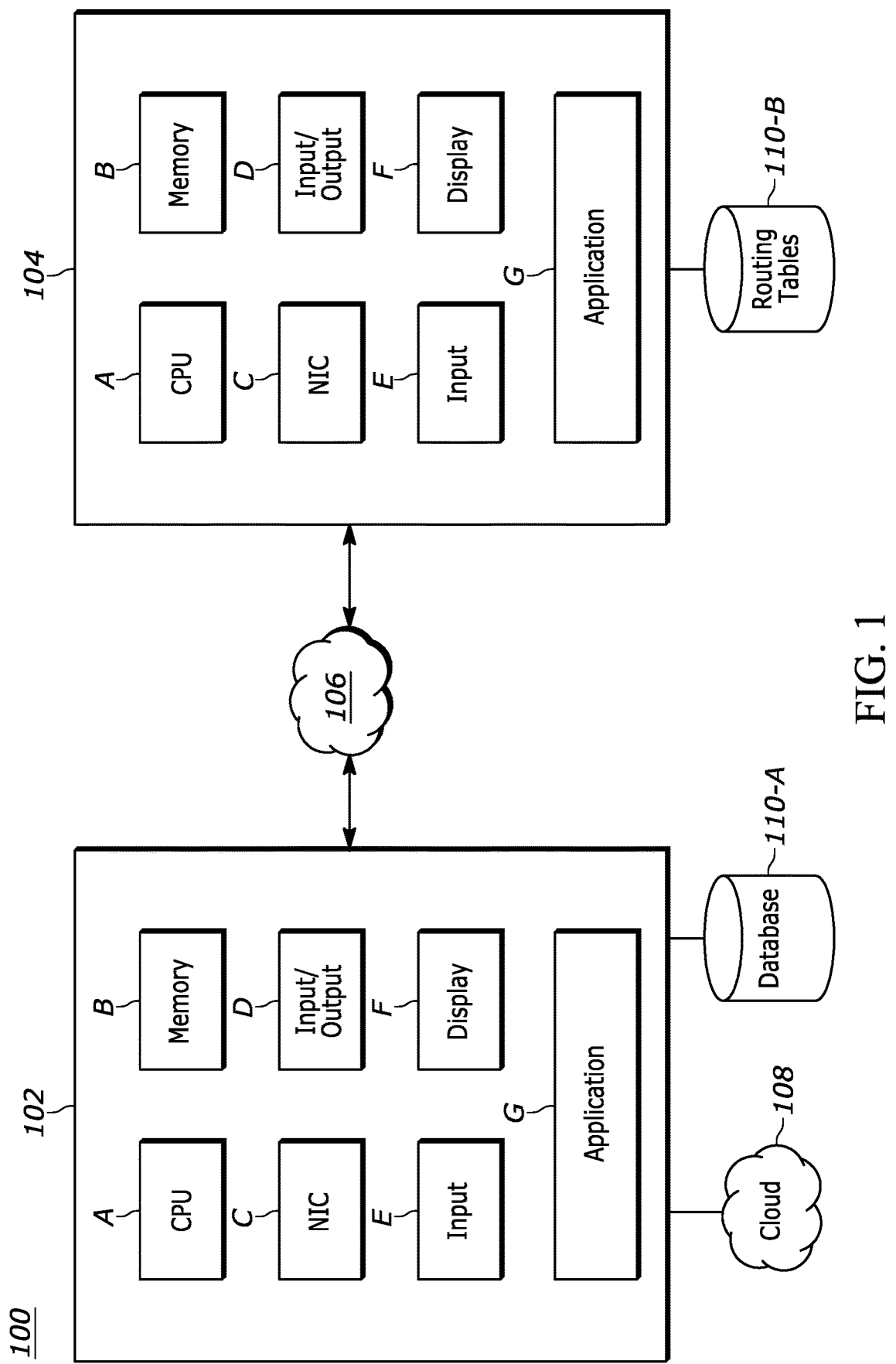
FIG. 1 depicts an exemplary system diagram of a system configured to intelligently collect and selectively share information technology asset inventories over a managed services platform, in accordance with various embodiments herein.

The present techniques include a description of systems and methods for intelligent collection and selective sharing of information technology asset inventory over a managed services platform, wherein an IT services company/provider may generate an avatar (e.g., a virtual machine and/or physical device/appliance) and distribute the avatar to a customer of the IT services company. The avatar may initiate a persistent network link between a network of the IT services company and a network of the customer. The avatar may permit the IT services company to access the network environment of the customer for the purpose of managing the IT services comprising the network environment, as well as performing routing functions. The IT service provider may be a corporation having separate divisions for a set of one or more facets of IT managed services operations, including without limitation, server management, configuration, field services, managed services, warranty services, etc. The avatar may allow each of the separate divisions of the IT service provider, as well as authorized third parties, to independently and simultaneously administer respective portions of the customer's computing environment. The avatar may include instructions for querying the customer's environment and reporting on the validity of aspects of the customer's environment, which the IT service provider may use to improve and/or certify aspects of the customer's IT infrastructure. The following disclosure includes numerous examples of functionality facilitated by the present techniques.

More specifically, the present techniques include systems and methods that enable intelligent collection and selective sharing of asset inventory over a managed services platform. Generally, such a managed services platform may be or include a base management node (BMN) and one or more information technology service provider devices communicatively connected to the BMN. The BMN may connect to a customer computing environment through a network tunnel and may communicate with the customer computing environment regarding information technology service provided by one or more information technology service providers. In particular, the BMN may acquire and leverage asset/service data for customers and information technology service providers to create a more efficient quoting, service, and/or otherwise general customer experience.

For example, a user (also referenced herein as a "hosting entity") of the present techniques may initially on-board a customer with a virtual machine instance, as part of the service of the BMN, and the customer may request asset information about any of the hosting entity's connected information technology service providers (e.g., Microsoft, CISCO, VMware, etc.). The customer may review these connected/available information technology service providers, and may make a determination regarding whether or not the customer wants to purchase and/or otherwise utilize the assets/services from any particular information technology service provider(s). The systems and methods of the present disclosure may then automatically retrieve the relevant asset/service information from the information technology service provider device and/or the BMN, and may present the asset/service information to the customer. The customer may then review the retrieved data, make a decision regarding which assets/services to purchase/utilize, and the hosting entity (and/or the managed services platform) may then facilitate the acquisition, installation, service agreements/contract execution necessary to appropriate the assets/services for the customer.

In some embodiments, the systems and methods of the present disclosure may automatically review data received from a customer, and may forward the some/all of the data to internal users (e.g., with access to the BMN) of the hosting entity that have specific use cases for the data. For example, a customer that has a managed service agreement with the hosting entity may contact a managed services internal user of the hosting entity when an asset/service requires maintenance or repair. When the customer contacts the managed services internal user, the user may pull the related customer's asset/service data from the managed services platform to analyze the relevant information about the asset/service.

To illustrate, a first customer's server purchased from a first information technology service provider may be malfunctioning. The hosting entity internal user may pull the information corresponding to the particular serial number of the malfunctioning server from the first information technology service provider's database to determine, e.g., maintenance history of the server, warranty information about the server, expected service life of the server, operating specifications of the server, etc. As a result, the hosting entity internal user may determine not only what may be fixed about the server, but how the hosting entity may further alleviate underlying issues that the first customer may be experiencing, as indicated by the malfunctioning server. For example, based on the malfunctioning server, the first customer may not currently have sufficient computing resources or cooling power, such that they may benefit from additional servers or additional fans/liquid cooling devices. Accordingly, the internal user may recommend and/or help the first customer acquire additional servers, cooling devices, and/or any other suitable assets/services.

Additionally, or alternatively, the customer may enter their preferences related to data sharing with information technology service providers and/or maintaining data at the hosting entity BMN and/or other suitable storage location (e.g., internal user device) in an encrypted form. If the customer selects for their data to be shared with the information technology service providers from whom they have purchased assets/services and/or have active contracts (or inactive/no contracts), then the customer's data (e.g., remaining asset service life, asset usage values (average available computing resources on customer's servers), warranty information, etc.) may be stored in the BMN and/or other suitable storage location (e.g., internal user device) in an encrypted format. When the hosting entity shares any data with a connected/active information technology service provider, the data may be decrypted at the BMN and/or internal user device and transmitted to the information technology service provider for their use. Thus, information technology service providers may be unable to independently decrypt data/information stored on the BMN and/or the internal user device after the data/information is initially encrypted. Further, if the customer does not want their data shared, then the BMN and/or the internal user device may be configured to maintain all the customer's data in an encrypted format, and the data will not be shared with any information technology service providers unless explicit consent is provided by the customer.

In accordance with the above, and with the disclosure herein, the present disclosure includes improvements in computer functionality or in improvements to other technologies at least because the present disclosure describes that, e.g., account management services, and their related various components, may be improved or enhanced with the disclosed systems and methods that provide more intelligent collection and selective sharing of asset inventory and corresponding data for respective customers/users. That is, the present disclosure describes improvements in the functioning of an account management system itself or "any other technology or technical field" (e.g., the field of IT services, and more specifically account management services) because the disclosed systems and methods improve and enhance operation of account management services by introducing an intelligent data collection and selective data sharing architecture that provides predictive servicing and eliminates security concerns, data management issues, and other inefficiencies typically experienced over time by account management systems lacking such systems and methods. This improves the state of the art at least because such previous account management systems are inefficient and insecure, as they lack the ability for such predictive servicing, selective sharing, and encrypted data transfer through a customer-specific management node in a manner that enables customers to receive holistic, anticipatory servicing without data privacy concerns.

In addition, the present disclosure includes applying various features and functionality, as described herein, with, or by use of, a particular machine, e.g., a remote computing device, a base management node (BMN), information technology service provider devices, and/or other hardware components as described herein.

Moreover, the present disclosure includes specific features other than what is well-understood, routine, conventional activity in the field, or adding unconventional steps that demonstrate, in various embodiments, particular useful applications, e.g., receiving, via a network tunnel between a machine avatar in a computing environment and a base management node, network traffic of the customer addressed to the one or more information technology services; storing, by one or more processors, a portion of the network traffic; generating, by the one or more processors, a service notification for the customer based on the portion of the network traffic; and transmitting, by the one or more processors, the service notification to the machine avatar through the network tunnel.

Example System

FIG. 1 depicts various aspects of an example system 100 configured to provide intelligent collection and selective sharing of asset inventory, in accordance with various embodiments herein. The high-level architecture of system 100 includes both hardware and software components, as well as various channels for communicating data between the hardware and software components. The system 100 may include hardware and software modules that employ methods of building, deploying and connecting both hardware and software. Using these modules, the system 100 and other components/configurations described herein may enable the intelligent collection and selective sharing of asset inventory disclosed specifically in reference to FIGS. 4 and 5. The modules may be implemented as computer-readable storage memories containing computer readable instructions (i.e., software) for execution by a processor of the system 100.

The system 100 may include a remote computing device 102, which may be communicatively coupled to an avatar 104 and/or to other components of system 100 via a network 106. The remote computing device 102 may include one or more personal computer, smart phone, laptop, tablet, blade server and/or other suitable computing device. The remote computing device 102 may include various hardware components, such as a central processing unit (CPU) 102A, a memory 102B, a network interface controller (NIC) 102C, an input/output (I/O) controller 102D, input device 102E, and/or a display device 102E. The CPU 102A may include any number of processors, including one or more graphics processing unit (GPU). The memory 102B may include a random-access memory (RAM), a read-only memory (ROM), a hard disk drive (HDD), a magnetic storage, a flash memory, a solid-state drive (SSD), and/or one or more other suitable types of volatile or non-volatile memory. The NIC 102C may include one or more physical networking devices (e.g., an Ethernet device, a wireless network controller, etc.). The NIC 102C may allow the remote computing device 102 to communicate with other components of the system 100 via a computer network such as the network 106. The I/O controller 102D may receive input and output from one or more input device (e.g., a peripheral device such as a detached keyboard or mouse) and one or more output device (e.g., a computer monitor, speaker, etc.) and an integral device such as a capacitive touch screen of a portable computing device. The I/O controller 102D may manage data communications between the CPU 102A and the memory 102B by, for example, loading data in a storage region of the memory 102B into a transient memory region of the memory 102B such as an application 102-G.

In an embodiment, the application 102-G may include executable program instructions (i.e., software) that, when executed by the CPU 102-A, causes one or more virtual machine instance stored in the memory 102-B to be loaded and/or modified. The one or more virtual machine instance may be stored in and/or retrieved from a database 110-A. In some embodiments, the application 102-G may also generate one or more virtual machine instances. The virtual machine instances may be containerized, in some embodiments using operating system-level virtualization using suitable containerizing techniques (e.g., Docker, Kubernetes, etc.).

The database 110-A may be directly coupled to the remote computing device 102 and/or accessible via the network 106. The database 110-A may be any suitable database (e.g., a structured query language (SQL) database, flat file database, NoSQL database, key-value store, file system-backed data store, etc.). In some embodiments the database 110-A may be storage area network (SAN) or a network attached storage (NAS) or a direct-attached storage (DAS). In an embodiment, the application 102-G may create, modify, or delete aspects of the database 110-A (e.g., by creating a new SAN on behalf of a customer). Portions of the one or more virtual machines may be stored in and retrieved from the database 110-A.

The system 100 may include multiple, differing parallel instances. For example, a first customer may be designated a first instance of the system 100. A second customer may be designated a second system instance of the system 100. The first system instance and the second system instance may be instantiated as respective VM instances, having segregated networks. The first system VM and second system VM may be isolated such that they are mutually inaccessible. The first system and the second system may, respectively, generate a set of one or more virtual machine instances. In an embodiment, a single customer may be associated with multiple instances of the system 100. For example, an A instance of the system 100 and a B instance of the system 100 may be created. The A instance and the B instance may be associated with a customer C, such that the customer uses the two instances for different business and/or practical purposes (e.g., to comply with data security requirements). In some cases, the A instance and B instance may be reciprocally accessible via a computer network, or unilaterally accessible (i.e., from A→B or B→A). Instance A and instance B may be respectively owned/controlled by one or more entities. In some embodiments, the system 100 may be instantiated wholly or partially in, and/or communicatively coupled to, one or more computing cloud 108 (e.g., a private cloud owned by the IT service provider and/or a third party public cloud). More than two instances may be used to implement embodiments of the system 100, as discussed below. Specifically, a connection funnel may maintain separation between networks of unrelated customers within the system 100 or within multiple instances of the system 100 belong to respective unrelated customers.

The remote computing device 102 may include a collection of servers and/or VMs instantiated in public and/or private cloud computing environments and/or data centers. The remote computing device 102 may include hardware and/or software owned by a customer of the IT service provider. However, in general, the remote computing device 102 may be administered and controlled by the IT service provider. The IT service provider's administration of the remote computing device 102 and the system 100 may include the deployment of the avatar 104, as either a physical server or a VM instance. For example, an IT service provider may administer the remote computing device 102 of the system 100 to add/remove computational resources (e.g., processors, memory, storage, etc.), add/remove applications, to add/remove connectivity (e.g., firewall rules), etc. Upstream services (i.e., services that are accessible to the remote computing device 102) may be made accessible to the network 106 via the creation of one or more tunnels in the remote computing device 102.

As noted, in some embodiments, the remote computing device 102 may connect to other components via a computer network such as the network 106. The network 106 may be a wireless network of a consumer network provider (e.g., a Global System for Mobile communication (GSM) provider or Code Division Multiple Access (CDMA) provider). In some embodiments the network 106 may be a private wireless network. In some embodiments, the network 106 may include an Internet Service Provider (ISP) such as a Tier 1 and/or Tier 2 network. In some embodiments, the network 106 may include the Internet and/or another suitable network (e.g., a local area network (LAN), a metropolitan area network (MAN), a wide area network (WAN), a mobile, a wired or wireless network, a virtual private network (VPN), etc.). The system 100 may include one or more application programming interface (API) service provided by a third party and/or the IT service provider (not depicted).

The avatar 104 may be leased or loaned to the customer backend component of the system 100, as a hardware appliance for the customer's use during the provision of services by the IT service provider, or as a virtual image that the customer could implement in the customer's own virtualization environment for use during the provision of services by the IT service provider. The avatar 104 may include various hardware components, such as a CPU 104-A, a memory 104-B, a NIC 104-C, an I/O controller 104-D, an input device 104-E, a display device 104-F, and an application 102-G. The CPU 104-A may include any number of processors, possibly including one or more GPUs. The memory 104-B may include a RAM, a ROM, a HDD, a magnetic storage, a flash memory, an SSD, and/or one or more other suitable types of volatile or non-volatile memory. The NIC 104-C may include one or more physical networking devices (e.g., an Ethernet device, a wireless network controller, etc.). The NIC 104-C may allow the avatar 104 to communicate with other components of the system 100 via a computer network such as the network 106. The input device 104-E may include one or more peripheral device such as a detached keyboard or mouse, or an integral device such as a capacitive touch screen of a portable computing device. The output device 104-F may be a suitable display device such as a computer monitor, capacitive touch screen, television screen, etc. In some embodiments, the avatar 104 may be a VM. In other embodiments, the avatar 104 may be a VM downloaded by the customer from the IT service provider. The avatar VM may be a large (e.g., gigabytes or larger) image file.

In some embodiments, the avatar 104 may be installed at the premises of the customer or a facility related to a customer (e.g., a corporate office, datacenter, etc.). In those embodiments, a customer employee/contractor may interact with the avatar 104 via the input device 104-E, the display device 104-F, and/or via a computer terminal communicatively coupled to the avatar 104. For example, an exemplary physical avatar may include a power supply (not shown), a set of data transfer and power cables (not shown), and a set of hardware ports (not shown). However, in other embodiments, the avatar may be a VM (i.e., composed of software). A power supply may include a direct current (DC) and/or alternating current (AC) power supply suitable for the electric power requirements of the avatar 104. The set of data transfer and power cables may include any suitable cabling (e.g., 2-wire, 4-wire, Ethernet cables, USB cables, HDMI cables, etc.). The set of hardware ports may include one or more suitable power and/or data transmission ports, including without limitation RJ-45 connector ports (e.g., Ethernet ports), AC/DC power ports, HDMI ports, USB ports, etc. In hardware embodiments, the avatar 104 may be of any suitable dimensions, and may be implemented using any suitable computing device(s) (e.g., a laptop, a server, a tablet, a mobile computing device, etc.). The avatar 104 may be a relatively low-powered device, in some embodiments, such as a thin client, internet-of-things device, etc.

The avatar 104 may include one or more modules implemented as hardware (e.g., a hardware appliance) and/or computer readable instructions (e.g., software). For example, the avatar 104 may include the application 104-G. The application 104-G may include instructions that execute upon the occurrence of an event. For example, the avatar 104 may include a set of instructions for establishing one or more tunnel via network 106 at boot time, and/or in the event of a network change (e.g., if a new dynamic IP address is assigned by a dynamic host configuration protocol (DHCP) server). The avatar 104 may be communicatively coupled to an electronic database 110-B. The electronic database 110-B may store data relating to the customer's business operations.

In operation, a customer may have a contract with the IT service provider, or may be considering hiring the IT service provider to provide services. That is, the customer may be an established customer or a new customer contracting with the IT service provider on a trial basis. The customer may contact the IT service provider by visiting a website hosted in the remote computing device 102 or another computer of the IT service provider. The website may serve a web page to the customer including a menu of available services. The menu may differ, depending on the status of the customer (e.g., new customer or existing customer). It should be appreciated that in some embodiments, the customer may add more services or order new services via another electronic medium (e.g., a telephone call to the IT service provider). The customer may then select from the menu of available services, and submit a list of desired services.

The application 102-G may analyze the list of services desired by the customer and, based on the desired services of the customer, generate either a customized VM appliance and/or generate an order for the creation of a physical appliance (i.e., an avatar). The application 102-G may include instructions for immediately delivering the generated customized VM appliance to the customer via a download link, via email, and/or via an automated installation in the computing cloud 108. The computing cloud 108 may include a resource (e.g., an existing VM) owned/controlled by the customer. In some embodiments, the customer may be required to grant access to the IT service provider before the customized VM appliance may be installed. Part of the grant of access may include granting access to firewall rules of the customer. In that case, the IT service provider may automatically configure the customized VM appliance to run in the chosen cloud, optionally based on the type of cloud, instantiate the customized VM appliance, and automatically configure the firewall rules associated with the VM appliance. In some embodiments, instructions for installing and/or configuring the customer's VM and associated firewall rules manually may be displayed/communicated to the customer, such as when the customer indicates that they will perform the VM installation/configuration on their own.

The instructions for installing/configuring the customer's firewall rules manually may instruct the customer to, inter alia, download the customized VM appliance, launch the VM appliance in an appropriate hypervisor/VM emulator, provide the VM appliance with certain permissions in the virtualization environment (e.g., to network layers and/or devices), and/or perform certain networking tasks (e.g., create virtual/physical networking device nodes, modify permissions, open ports, filter network packets (e.g., IPv4 packets, IPv6 packets, etc.) by type, etc.). However, in general, the instructions may be limited to asking the customer to boot the VM and to open ports in the customer's external firewall. Specifically, the VM may be instantiated behind a general corporate or router-based firewall of the customer, and ports exterior to that corporate firewall may need to be opened to allow the IT service provider to reach the avatar 104 (i.e., the instantiated VM appliance/physical appliance). In some embodiments, the avatar 104 may be installed in a de-militarized zone (DMZ) of a network, which may obviate the need to open ports. In other cases, more complex procedures may be advised, such as establishing port-knocking software. Access-based controls such as VPN passthroughs via IPSec may be used.

When the customer boots the avatar for the first time, whether virtual or physical, the avatar may execute an initialization procedure including a set of executable program instructions. In an embodiment, the IT service provider may instantiate two or more multiple remote computing device 102. The two or more remote computing device 102 may perform different functions. For example, a first remote computing device 102 may perform a port forwarding function. A second remote computing device 102 may perform an intermediary host function. A third remote computing device 102 may perform a connection funnel function. A fourth remote computing device 102 may perform a firewalling function, and so on.

Each of the two or more remote computing device 102 may include more or less hardware and/or software, and different sets of installed hardware and/or software as appropriate. For example, the port forwarder remote computing device 102 may include multiple physical interface devices to perform forward and reverse proxying operations using multiple physical and/or virtual (e.g., TUN/TAP) virtual network interface. The IT service provider may associate the remote computing device 102 with a particular customer. In that case, the remote computing device 102 may be known as a Base Management Node (BMN). The BMN may run services of the customer (e.g., a Remote Authentication Dial-In User Service (RADIUS)).

In some embodiments, each customer of the IT service provider may be provided with a BMN wherein each BMN has an address that corresponds to the customer's environment. When a BMN is used, the avatar 104 provided by the IT service provider to the customer may be a thin client. If the thin client is stolen or misplaced, then sensitive material on the avatar may be minimized. Full disk encryption may, therefore, not be necessary and the avatar 104 may be invalidated and blocked from connecting to the BMN. From a risk perspective, keeping information segmented by the use of the avatar 104 is very beneficial and results in a much smaller hardware footprint and software footprint in the customer's network customer side. The avatar 104 may be a relatively low-powered device (e.g., an Internet-of-Things (IoT) device).

Once the avatar 104 is delivered to the customer, whether the avatar 104 is a physical device or a virtual machine, the avatar 104 may run an initialization procedure. The initialization procedure may take place only one time, when the avatar 104 is first connected to the network 106, for example. The initialization protocol may include the avatar 104 connecting to one of a plurality of purpose-built computing environments that are accessible via the network 106. The initialization protocol may include establishing a set of one or more tunnels between the avatar 104 and a set of one or more a BMNs.

Example Data Flow Diagram

Figure 2:
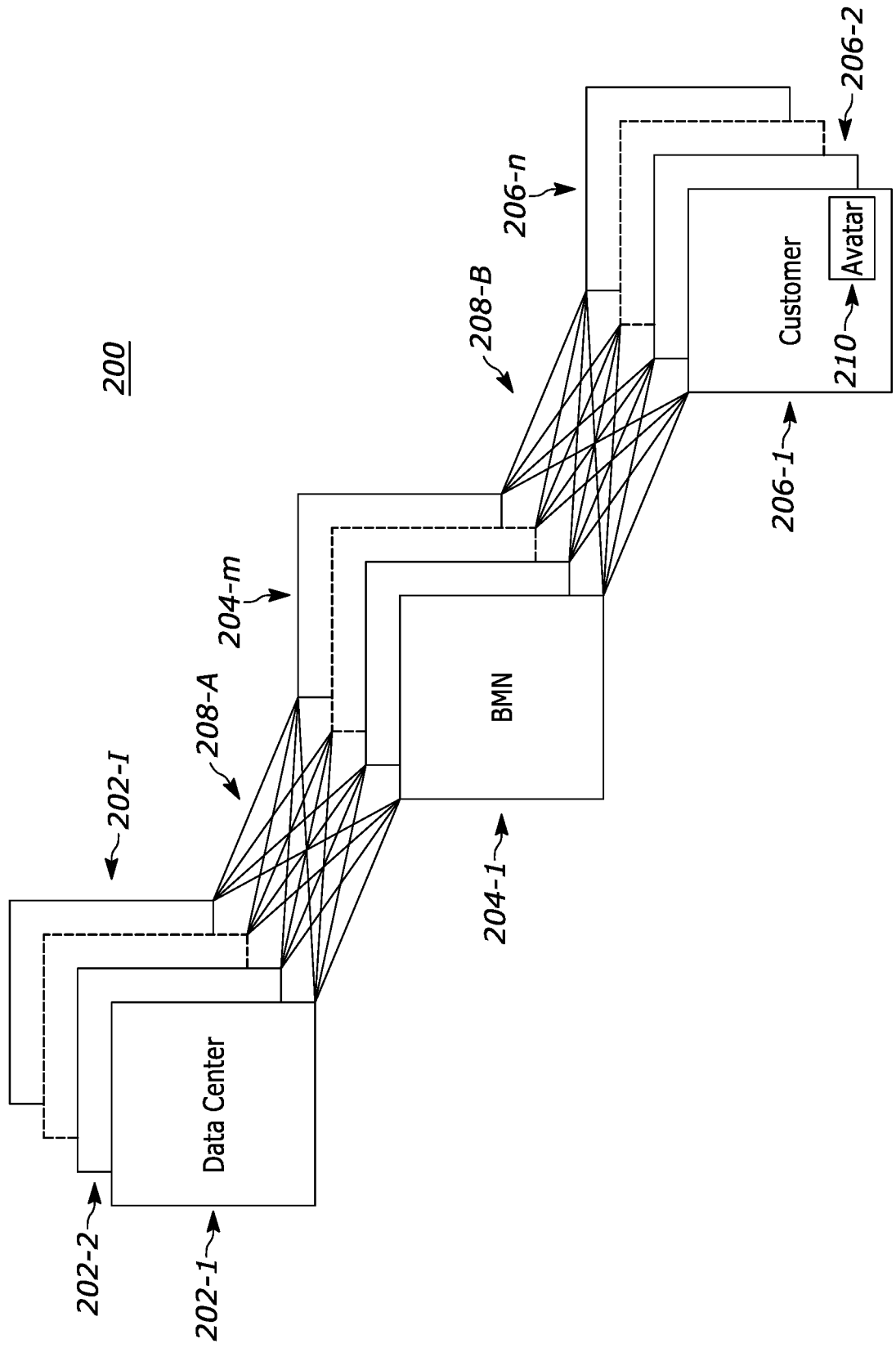
FIG. 2 depicts an exemplary data flow diagram, in accordance with various embodiments herein.

FIG. 2 is a data flow diagram 200 illustrating the operation of methods and systems for intelligent collection and selective sharing of asset inventory. Some embodiments may include one or more data centers. The data centers may include data center 202-1, 202-2, through 202-*l*, each of which may be located in the United States or elsewhere. The data flow diagram 200 may include BMNs 204-1, 204-2 through 204-*m*. The data flow diagram 200 may include customer infrastructure 206-1, 206-2 through 206-*n*. The numbers l, m, and n may be any positive integers. That is, data flow diagram 200 may include any number of data centers, BMNs, and/or customer infrastructure. The data flow diagram 200 depicts each data center as being communicatively coupled to each BMN via communication links 208-A, and each BMN as being communicatively coupled to each customer infrastructure via communication links 208-B. However, in some embodiments fewer links may exist. For example, links 208-A may include one communicative link between the data center 202-1 and the BMN 204-1. In some embodiments, each BMN may be linked to one corresponding customer infrastructure. Customer infrastructure 206-1 through 206-*n* may each include a respective set of one or more avatar 210, each of which may correspond to the avatar 102, for example.

As discussed above, the avatar 210 may connect to one of a plurality of purpose-built computing environments during the initialization procedure. The avatar 210 may first connect to a connection broker, identifying the avatar 210 by providing a unique identifier (e.g., a universally-unique identifier (UUID)) to the connection broker as a parameter. The connection broker may compare the UUID to a list of avatars in a database, such as database 110-A, to identify a data center corresponding to the avatar 210. Based on the UUID, the connection broker may determine which BMN to build a connection to. Connecting to the connection broker may include identifying a monitoring environment for the customer. For example, a small customer may have a subscription with the IT services company to a service (e.g., a monitoring service) in a first data center (e.g., a data center located in Chicago). The tunnel may then be established to the first data center (e.g., the data center 202-1). Building the connection may include creating multiple TUN devices in the avatar 210. The connection broker may transmit a set of initialization data to the avatar 210, the initialization data including an IP address for the avatar. The avatar 210 may build a point-to-point (P2P) link, using the IP address, wherein packets flow seamlessly between the BMN 204-1 and devices in the customer infrastructure 206-1 via the avatar 210, over the P2P link. A P2P link may differ from an Ethernet link insofar as that the P2P link may be a network level (i.e., layer-3) link, whereas the Ethernet link may be a level-2 link. Various protocols (e.g., NTP, HTTP, RDP, etc.) may be simultaneously routed between the customer environment 206-1 and the BMN 204-1. The initialization protocol may be run at given times (e.g., when a connection of the avatar 210 is disconnected, when the device or virtual machine implementing the avatar 210 reboots, on a schedule, etc.). The avatar 210 may also include a second initialization routine. For example, if the selected data center is unavailable, such as in the event of catastrophic failure, disaster recovery test, etc., then the avatar 210 may include a set of instructions for automatically routing to a fallback data center.

The avatar 210 may require two or more IP addresses in the customer infrastructure 206-1. For example, a first IP address may be used by the avatar 210 for connectivity inbound to the customer infrastructure 206-1, and a second IP address may be used for outbound connectivity to the BMN 204-1. The BMN may masquerade for services behind it, that is, services that are only accessible to users of the customer infrastructure 206-1 via the BMN. The customer may have limited visibility of the services behind the BMN. The linkages between the customer infrastructure 206-1 and the BMN 204-1 may be such that a user of customer infrastructure 206-1 through 206-*n* inspecting the network environment of customer infrastructure 206-1 (e.g., via ping) would not see any evidence of the IP address of the avatar 210 installed in the customer infrastructure 206-1. Rather, the customer would see an IP address belonging to the BMN. Additionally, the avatar 210 may enable computers in the customer's network to access the BMN without configuring firewalls, routers, etc. The customer may need to only open two or more ports in the customer infrastructure 204-1 firewall or another firewall. The avatar 210 may be located in any location that is communicatively coupled to the customer infrastructure can be located anywhere, and need not be located in the customer's physical or virtual network. In some embodiments, the avatar 210 can be located in a geographic region other than where the customer infrastructure 206-1 is located (e.g., in another country).

In general, the collection of avatar 210 machines and their respective links allow the IT services company to effectively manage customer environments at scale on a customer-by-customer basis, to meet the need of each customer. For example, some customers may be provided with redundant environments, data centers, avatars, and/or BMNs. A customer representing monthly revenue of $50 may not be provisioned redundantly. However, a $25,000/month customer may be provisioned using fully replicated/redundant resources. The IT service provider may operate a cloud system that enables on-demand horizontal scaling without practical resource limitations.

The architecture represented by data flow diagram 200 is much more cost effective than hardware-based systems of the past. As noted above, under old models, the IT services company had to send hardware to the customer at the outset of a business relationship, and periodically throughout the business relationship. Using the architecture represented by data flow diagram 200, the IT services company can provide just-in-time backend services, and can project services to the customer on demand by, for example, modifying a BMN associated with the customer. The scaling aspect is also very useful for prototyping and marketing purposes. Normally, an IT services company that wanted to provide 5,000 samples of IT services would need to send 5,000 managed hardware devices to individual customers. However, using the architecture represented by data flow diagram 200, the IT services company can send 5,000 invitations, and only activate as many avatar device resources (virtualized or hardware) as interested customers respond to the invitations.

The avatar 210 may be deployed into an existing cloud computing platform (e.g., via Amazon Web Services) by virtual deployment. The IT service provider may then connect to the customer infrastructure associated with the avatar 210 via the existing cloud to manage resources in the customer infrastructure that are not in the existing cloud as well as resources that are accessible via the existing cloud. Each customer may have their own virtual infrastructure from a networking and data traffic perspective. This isolation satisfies numerous compliance and security requirements.

The methods and systems described herein are applicable to any managed services environment including, without limitation, those of insurance, healthcare, manufacturing, e-commerce, and financial services companies. Federal, state, and municipal government IT resources may be managed using the architecture represented by data flow diagram 200. In some embodiments, concerns and/or suggestions regarding the architecture represented by data flow diagram 200 may result in infrastructure upgrades that may be propagated between customers. The architecture represented by data flow diagram 200 allow the IT service provider to expand the IT service provider's existing toolset into the customer's environment. For example, a service VM may be transferred via the avatar 210 to the customer infrastructure 206-1. The service VM may be accessible only by the IT service provider, and may include instructions for analyzing and modifying aspects of the customer infrastructure 206-1. Tools, firewall rules, and other resources that customers might typically need for IT services may be eliminated. Further, because the IT service provider has greater direct control over the service environment (e.g., the remote computing device 102), the IT service provider can tune those critical aspects of the service environment (e.g., geographic redundancy, high-availability, etc.) on an as-needed basis.

As another example, the architecture represented by data flow diagram 200 enables an IT service provider that may be a hosting entity associated with the BMN 204-1 to intelligently collect and selectively share asset inventory, as described further herein. Namely, the BMN 204-1 may receive communications (i.e., data packets) from the customer 206-1 and may store the data from those communications for analysis by internal users (not shown) of the IT service provider that may have access to the BMN 204-1. Thus, the internal users of the hosting entity may determine features (e.g., expiration dates of contracts, maintenance schedules of assets, predicted required computing capacity, additional recommended services/assets) of the services/ assets owned by the customer 206-1, and may provide notifications to the customer 206-1 regarding the determined features. For example, the BMN 204-1 may receive data from the customer 206-1 relating to a server purchased by the customer 206-1, and the data may indicate that the server is due for maintenance and/or may require a hardware/ software update. Accordingly, an internal user of the IT service provider with access to the BMN 204-1 may review the data from the customer 206-1 and may provide one or more service notifications/recommendations to the customer 206-1. In any event, these and other functionalities may be described further herein in reference to FIGS. 4 and 5.

Example Automated IT Services Management System

Figure 3:
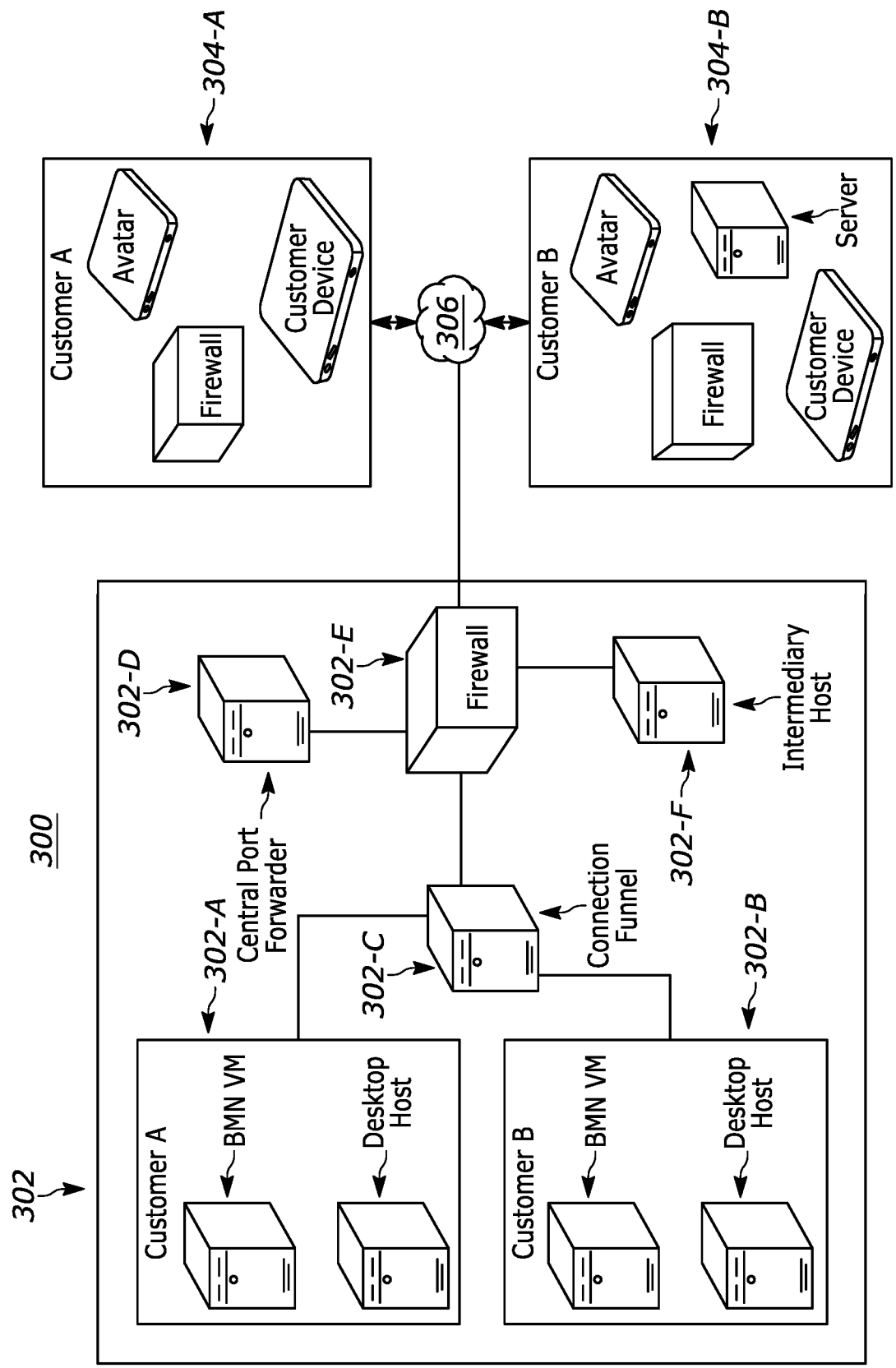
FIG. 3 is a system diagram depicting an IT service provider infrastructure, in accordance with various embodiments herein.

FIG. 3 is a system diagram 300 including an IT service provider infrastructure 302 including respective customer hosting regions and customer infrastructure, and a network 306. The IT service provider infrastructure 302 may include a customer service region 302-A, a customer service region 302-B, a connection funnel 302-C, a central port forwarder 302-D, a firewall 302-E, and an intermediary host 302-F. Although only two customer service regions are depicted, any practical number of customers and service regions may be supported in IT service provider infrastructure 302. System diagram 300 may also include a customer infrastructure 304-A and a customer infrastructure 304-B, which may correspond, respectively, to the customer service region 302-A and the customer service region 302-B. The customer infrastructure 304-A and the customer infrastructure 304-B may represent data centers of the respective customers. The IT service provider infrastructure 302 may be communicatively coupled to the customer infrastructure 304-A and the customer infrastructure 304-B via the network 306. The network 306 may correspond to the network 106 depicted in FIG. 1.

As noted above, the avatar in customer infrastructure 304-A may execute initialization instructions based upon the occurrence of an event (e.g., at boot time, if connectivity is lost, upon receiving/retrieving a signal, etc.). In some embodiments, the avatar may correspond to the avatar 104 and/or the avatar 210. The initialization instructions may include connecting the avatar to one or more connection broker (not depicted). The connection broker may be thought of as a traffic director. The avatar may identify itself by providing an identification parameter to the connection broker, and the connection broker may determine the owner/ controller customer associated with the avatar by associating the identification parameter in a database comprising customer information, such as the database 110-A. The connection broker may determine one or more priority data centers (e.g., Chicago and Milwaukee). The data center(s), which may correspond to the data center 202-1 through the data center 202-*l* of FIG. 2, may be based on geographic proximity to the avatar, in some embodiments. Because multiple priority data centers are identified, if one of the data centers is unreachable, one of the other data centers may act to handle the customer's connectivity.

The avatar may then connect to the intermediary host 302-F. By default, the avatar may be unreachable from the Internet. When the avatar connects to the intermediary host 302-F (e.g., via secure shell (SSH)), the avatar may create a persistent connection to the intermediary host 302-F. The intermediary host 302-F may reside in the provider infrastructure 302, and may be accessible only from within the provider infrastructure 302. Therefore, in an embodiment, a host (e.g., a networked computer) in the provider infrastructure 302 may be able to connect to the avatar via the intermediary host 302-F and the customer firewall within the customer infrastructure 304-A, without creating a connection that is visible to hosts on the open Internet (e.g., hosts accessible via the network 306). Here, the intermediary host 302-F may have a level of trust that is higher than other hosts, and various forms of authentication may be used to enforce access to the customer infrastructure 304-A (e.g., public and/or private key authentication, multi-factor authentication, etc.).

In an embodiment, the connection between the avatar and the intermediary host 302-F may comprise two network tunnels. The two tunnels may allow traffic to flow to and from the avatar via the intermediary host 302-F. Further, one or more additional persistent tunnels may be created between components of the customer service region 302-A and the avatar via the intermediary host 302-F, establishing one or more tunnel linked to the one or more respective remote computing device 102.

From the perspective of a customer within the customer infrastructure 304-A, the BMN of customer service region 302-A may appear to be directly connected to the customer infrastructure 304-A, even though several network hops are required to reach the BMN. The BMN may be located in a data center. Furthermore, the BMN may be associated with one or more services that the BMN is responsible for forwarding to the customer in the forward and reverse direction. For example, one or more monitoring collector may be associated with the BMN. Each of the one or more monitoring collector may collect data from the customer infrastructure 304-A via the connection(s) linking the avatar to the BMN discussed above. The BMN may transparently proxy/masquerade the connections to and from the avatar via the BMN, such that if the customer were to inspect the packets, the customer would not be able to tell that a particular one of the one or more monitoring collector was initiating and/or receiving the traffic. Additionally, the customer may not able to determine the ultimate destination of any packets sent to the BMN.

In some embodiments, 302 is a single pod. Each one may have a central port forwarder 302-D, connection funnel 302-C, etc. In this way, a customer may have their own set of services and tunnel stack, keeping the customer environments segregated and not inter-accessible. In some embodiments, the separation may be enforced in user space via a software-defined network. The firewall 302-E may restrict the packets that may be passed between the intermediary host 302-F and the connection broker.

In some embodiments, the connection funnel 302-C may include IP blacklists on a per-BMN and/or per-customer basis. For example, the connection funnel 302-C may include a list C of customers $C_1$-$C_n$ in association with an address space for each customer C, wherein n is a positive integer. The connection funnel 302-C may be a software-driven firewall including rules for filtering packets according to whether a given BMN may transmit packets to a given address space of a particular customer in C. For example, the BMN depicted in customer service 302-B may have a first Ethernet card (e.g., eth0). Connection funnel 302-C may include firewall instructions such that packets from the first Ethernet card having an IP address matching the BMN may only be sent to hosts in the IP range 8.9.10.0-8.9.10.255. That is, only 256 hosts could possibly receive packets from that BMN, and no others. In some embodiments, the firewall instructions may similarly restrict other BMNs (e.g., the BMN in customer service region 302-A) from sending packets to those IP ranges. In some embodiments, the IP range may be specified as a set of Classless Inter-Domain Routing (CIDR) network specification. For example, to continue the example, the above IP range could be specified as 8.9.10.0/24. Network traffic may also be restricted to only that traffic sent via the intermediary host 302-F on a given port.

The customer funnel 302-C includes rules preventing customer service region 302-A from contacting customer service region 302-B. The connection funnel 302-C is automatically updated any time a new customer service region is added and/or deleted. When an appliance comes online, the customer service region is created, and the appropriate firewall rules are automatically added to the connection funnel 302-C.

In this manner, the IT service provider infrastructure 302 improves the security of such route provisioning and/or general communications between the infrastructure 302 and individual customer infrastructures 304-A, 304-B relative to conventional techniques by limiting the connectivity of individual customer service regions 302-A, 302-B (e.g., BMNs) to specified IP addresses. Additionally, the automatic appropriation of firewall rules and updating of the connection funnel 302-C upon creation of a new customer service region further improves over conventional techniques, such that communications between customer service regions 304-A, 304-B and the IT service provider infrastructure 302 are significantly more difficult to intercept and/or circumvent. These advantages, inter alia, are leveraged when, e.g., providing account management services such as intelligent collection and selective sharing of asset inventory, that rely on secure communications between a customer service region 302-A, 302-B and the IT service provider infrastructure 302, as described herein in reference to FIGS. 4 and 5.

Figure 4:
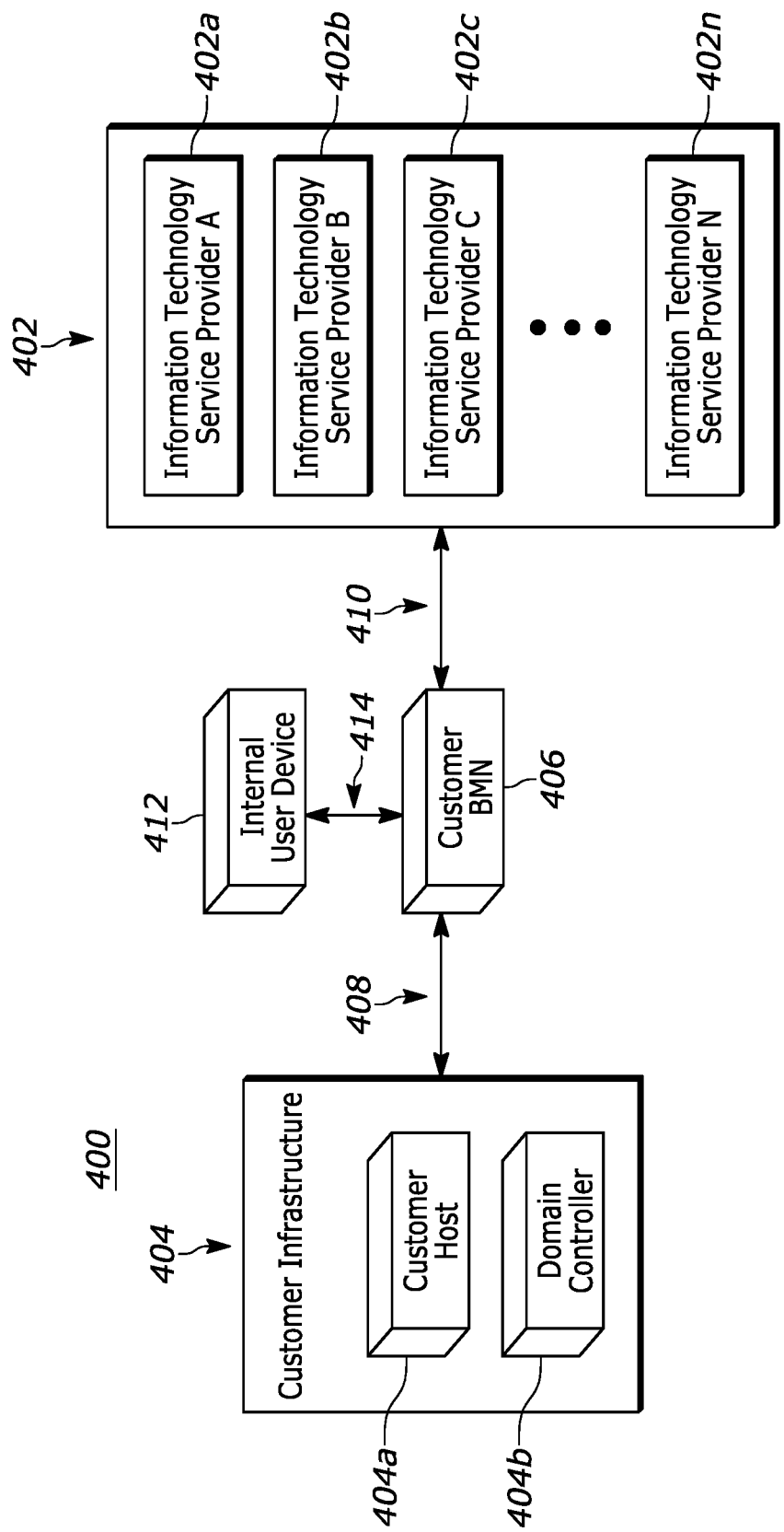
FIG. 4 depicts an exemplary operation environment, in accordance with various embodiments herein.

Example Operation of Automated Intelligent Collection and Selective Sharing of Asset Inventory FIG. 4 depicts an exemplary operation environment 400, in accordance with various embodiments herein. The exemplary operation environment 400 may include an IT service provider region 402, a customer infrastructure 404, a customer BMN 406, and an internal user device 412. The IT service provider region 402 may be or include multiple IT service provider devices that are communicatively coupled/connected to the customer BMN 406, and/or may provide IT services for the customer through the customer BMN 406. The customer infrastructure 404 may correspond to the customer infrastructure 304-A, or another customer infrastructure, of FIG. 3. The internal user device 412 may be or include a computing device that is communicatively connected to the customer BMN 406, that may have access to the customer data received from the customer infrastructure 404, and/or may otherwise receive customer data from the customer infrastructure 404. Operation environment 400 may include a connection funnel, central port forwarder, firewall, and intermediary host; which may respectively correspond to the connection funnel 302-C, the central port forwarder 302-D, firewall 302-E, and intermediary host 302-F of FIG. 3. A connection broker may also be included in the environment 400. The connection broker may correspond to the remote computing device 102 of FIG. 1.

Generally, the IT service provider region 402 may provide IT services and/or assets that the customer infrastructure 404 may utilize. The customer BMN 406 may connect to the customer infrastructure 404 through a network tunnel (e.g., represented by network communication link 408), and may communicate with the customer infrastructure 404 regarding the IT services/assets provided by the one or more IT service providers in the IT service provider region 402. For example, the IT service provider region 402 may include multiple IT service provider devices, such as IT service provider device A 402a, IT service provider device B 402b, IT service provider device C 402c, and IT service provider device N 402n. Of course, the IT service provider region 402 may include any suitable number of IT service provider devices, such that N/n may correspond to any integer value. Accordingly, the customer infrastructure 404 may acquire IT services/assets from any suitable number of IT service providers that are included as part of the IT service provider region 402.

As previously mentioned, the customer BMN 406 may mediate communications between the IT service provider region 402 and the customer infrastructure 404. The customer BMN 406 may also acquire and leverage asset/service data from the customer infrastructure 404 and the IT service provider region 402 to create a more efficient quoting, service, and/or otherwise general customer experience. For example, the hosting entity may initially on-board the customer with the customer infrastructure 404 as a virtual machine instance, as part of the service of the BMN 406. The customer utilizing the customer infrastructure 404 may request asset information about any of the hosting entity's connected IT service/asset providers in the IT service provider region 402. The customer may review these connected/available IT service providers, and may make a determination regarding whether or not the customer wants to purchase and/or otherwise utilize the assets/services from any particular IT service provider(s) 402a-n. The BMN 406 may then automatically retrieve the relevant asset/service information from the IT service provider device 402 and/or from a storage location on the BMN 406, and may transmit the asset/service information to the customer infrastructure 404. The customer may then review the retrieved data, make a decision regarding which assets/services to purchase/utilize, and the hosting entity (e.g., via the customer BMN 406, internal user device 412) may then facilitate the acquisition, installation, service agreements/contract execution necessary to appropriate the assets/services for the customer.

In certain instances, the customer BMN 406 and/or the internal user device 412 or a user of the internal user device 412 may automatically review data received from a customer, and may forward the some/all of the data to such internal users of the hosting entity that have specific use cases for the data. For example, a customer that has a managed service agreement with the hosting entity may contact an internal user device 412 of a managed services internal user of the hosting entity when an asset/service requires maintenance or repair. When the customer contacts the managed services internal user, the internal user may pull the related customer's asset/service data from the customer BMN 406 to analyze the relevant information about the asset/service.

To illustrate, a first customer's server purchased from IT service provider A 402a may be malfunctioning. A hosting entity internal user may utilize internal user device 412 to retrieve/access data corresponding to the particular serial number of the malfunctioning server from the IT service provider A's 402a database to determine, e.g., a maintenance history of the server, warranty information about the server, an expected service life of the server, operating specifications of the server, and/or other related information about the server. As a result, the hosting entity internal user may determine what may be fixed about the server, and/or how the hosting entity may further alleviate underlying issues that the first customer may be experiencing, as indicated by the malfunctioning server.

For example, based on the malfunctioning server, the first customer may not currently have sufficient computing resources or cooling power, such that they may benefit from additional servers or additional fans/liquid cooling devices. Accordingly, the internal user may recommend and/or help the first customer acquire additional servers, cooling devices, and/or any other suitable assets/services. The customer BMN 406 may generate a service notification that includes some/all of this data/information accessed and analyzed by the internal user device 412. The service notification may indicate that the expected issue with the first customer's server is a lack of adequate cooling devices, and that a probable solution to the server malfunctioning is to acquire more cooling devices. To facilitate the first customer acquiring additional cooling devices, the service notification may also include an interactive link or other option to connect the first customer with the internal user (e.g., via the internal user device 412). Thus, if the first customer decides to purchase and/or otherwise acquire more cooling devices to alleviate the server issues, the first customer may interact with the provided option in the service notification and may communicate directly with an internal user to purchase/acquire/install the additional cooling devices.

As another example, a second customer may have active IT service contracts for two services from IT service provider C 402c and a third service from IT service provider N 402n. A hosting entity internal user may utilize internal user device 412 to retrieve/access data corresponding to the two active service contracts from IT service provider A's 402a database and the active service contract from IT service provider N's 402n database to determine relevant information/terms in the service contracts. For example, the internal user device 412 and/or the internal user may analyze the service contracts and determine an expected remaining active term of the service contracts, warranty information included in the service contracts, services covered under the service contracts, and/or other related information about the service contracts. As a result, the hosting entity internal user may determine what terms of the service contracts may be of interest to the second customer, and/or how the hosting entity may further alleviate underlying issues that the second customer may be experiencing, as indicated by the service contract terms.

To expand on the prior example, the two service contracts with the IT service provider C 402c may expire within the next month, and the service contract from the IT service provider N 402n may not expire within the next three months. The internal user device 412 may retrieve this data from the customer BMN 406, and may determine that the second customer may need to renew and/or review the service contracts for the two services with the IT service provider C 402c within the next week. The internal user device 412 and/or the customer BMN 406 may generate and transmit a service notification for the second customer indicating that the two service contracts with IT service provider C 402c may expire soon to the customer infrastructure 404. The second customer may then optionally contact the internal user device 412 through the customer BMN 406 to discuss renewal options for the two services currently provided by the IT service provider C 402c. The internal user may thereby assist the second customer with service contract renewal, assessing the term adjustments/negotiation with the IT service provider C 402c, and/or negotiating contract terms with additional/alternative service providers. Moreover, the internal user may review the second customer's IT service needs/requirements to determine whether or not the second customer should continue to purchase the IT services represented by the two service contracts with the IT service provider C 402c.

In certain embodiments, the customer BMN 406 and/or the internal user device 412 may generate a proactive notification for the customer based on a portion of network traffic stored on, for example, the customer BMN 406 and/or the internal user device 412. In these embodiments, the proactive notification may have a timed transmission threshold indicating that some action from the customer related to the portion of network traffic may be required in advance of the expiration of the timed transmission threshold. If the customer BMN 406 and/or internal user device 412 determines that the timed transmission threshold is satisfied, the customer BMN 406 and/or the internal user device 412 may store the network traffic from the customer infrastructure 404 responding to the proactive notification and/or forward the response to a corresponding IT service provider 402*a-n*.

For example, the customer BMN 406 and/or the internal user device 412 may analyze stored IT service data of the customer and determine that an IT asset purchased by the customer may require maintenance within the next month. The customer BMN 406 and/or the internal user device 412 may generate a proactive notification indicating the required maintenance, and the proactive notification may also indicate that the customer has two weeks to request maintenance for the IT asset, or the customer may void the warranty for the IT asset. If the customer transmits network traffic (i.e., a response) indicating that the customer has requested maintenance and/or that the customer is requesting maintenance via the customer BMN 406, then the customer BMN 406 and/or the internal user device 412 may store the response. Further, the customer BMN 406 and/or the internal user device 412 may forward the response to the corresponding IT service provider 402*a-n* to ensure that the IT service provider 402*a-n* does not void the warranty on the IT asset. Of course, the service notifications described herein may be or include any proactive and/or otherwise time-sensitive notifications described herein.

Additionally, or alternatively, the customer may enter their preferences related to data sharing into the customer infrastructure 404 with IT service providers and/or maintaining data at the customer BMN 406 in an encrypted form. If the customer selects for their data to be shared with IT service providers from whom they have purchased assets/services and/or have active contracts (or inactive/no contracts), then the customer's data (e.g., remaining asset service life, asset usage values (average available computing resources on customer's servers), warranty information, etc.) may be stored in the customer BMN 406 and/or the internal user device 412 in an encrypted format. When the hosting entity shares any data with a connected/active IT service provider 402*a-n*, the data may be decrypted at the customer BMN 406 and transmitted to the IT service provider region 402 for use by the associated IT service provider 402*a-n*.

In some embodiments, the customer BMN 406 may store and/or execute an encryption algorithm (not shown) that is configured to encrypt/decrypt all and/or a portion of network traffic received from the customer infrastructure 404, the IT service provider region 402, and/or the internal user device 412. The customer BMN 406 may also execute the encryption algorithm to decrypt stored data/information prior to transmitting the stored data to the customer infrastructure 404, the IT service provider region 402, and/or the internal user device 412. In certain embodiments, the customer host 404*a* may encrypt any data/information related to active IT service contracts and/or IT assets prior to transmitting the data/information to the customer BMN 406.

Additionally, or alternatively, the customer BMN 406 may forward any received network traffic to the internal user device 412 for storage and/or encryption/decryption. For example, the customer BMN 406 may receive network traffic from the customer infrastructure 404 that should be encrypted and stored on the internal user device 412. Accordingly, the customer BMN 406 may create a temporary cache file representative of the received network traffic and may forward the network traffic to the internal user device 412. The internal user device 412 may store and/or otherwise have access to a data encryption tool/application (not shown), which the internal user device 412 may execute or access to execute the encryption algorithm and encrypt/decrypt any portion of the received network traffic. Thus, when such encrypted data is requested by a service provider or otherwise, the customer BMN 406 may request the encrypted data from the internal user device 412, which may decrypt the data using the data encryption tool/application prior to transmitting the data to the customer BMN 406 and/or directly to the source of the data request (e.g., customer infrastructure 404, IT service provider region 402).

Thus, IT service providers 402*a-n* may be unable to independently decrypt data/information stored on the customer BMN 406 and/or the internal user device 412 after the data/information is initially encrypted. Further, if the customer does not want their data shared, then the customer BMN 406 and/or the internal user device 412 may be configured to maintain all the customer's data in an encrypted format, and the data may not be shared with any IT service providers 402*a-n* unless explicit consent is provided by the customer. For example, a third customer may have an IT asset purchased from the IT service provider B 402*b*, and the IT service provider B 402*b* may request information from the customer BMN 406 corresponding to the third customer's IT asset. The customer BMN 406 may request and/or may have already received permission from the third customer regarding sharing the third customer's data/information with the IT service provider B 402*b*, from whom, the third customer purchased the IT asset. In the event that the third customer authorized data sharing with the IT service provider B 402*b*, the customer BMN 406 and/or the internal user device 412 may decrypt the stored data of the third customer and may transmit the decrypted data to the IT service provider B 402*b* device.

As part of the communications transmitted by the customer BMN 406 to the IT service provider region 402, the customer BMN 406 may share data with the IT service providers 402*a-n* using multiple application programming interfaces (APIs). The IT service providers 402*a-n* may each utilize different APIs, such that the customer BMN 406 may be required to utilize one of a plurality of APIs at any given time to efficiently communicate information/data with relevant IT service provider(s) 402*a-n*. Namely, in certain embodiments, the customer BMN 406 may share data corresponding to one or more IT services and/or assets with the two or more IT service providers 402*a-n* by utilizing two or more APIs. Each API of the two or more APIs may be associated with a respective IT service provider 402*a-n* within the IT service provider region 402.

Moreover, when receiving network traffic from the IT service providers 402*a-n*, the customer BMN 406 may standardize this network traffic for storage in a standardized information technology service data file. The customer BMN 406 may include a standardization algorithm (not shown) that is configured to extract IT services data/information from standard data fields within the network traffic received from the IT service providers 402*a-n*. The standardization algorithm may also create documents, files, and/or other data entries that have a standardized format based on the data type represented by the IT services data/information included in the network traffic.

For example, network traffic from IT service provider A 402a may represent an update for a first IT asset (e.g., a server) purchased from the IT service provider A 402a, where the network traffic includes specification data for the first IT asset in multiple, disparate fields within the network traffic. In this example, network traffic from IT service provider B 402b may represent an update for a similar second IT asset (e.g., another server), where the network traffic includes the specification data for the second IT asset in a single field within the network traffic. Thus, the customer BMN 406 may execute the standardization algorithm on the network traffic from the IT service provider A 402a and IT service provider B 402b to create two data entries for a standardized information technology service data file. The first data entry may include data/information in three data fields that is extracted from the multiple, disparate fields of the network traffic of the IT service provider A 402a. Similarly, the second data entry may include data/information in the same three data fields that is extracted from the single field of the network traffic of the IT service provider B 402b. In this manner, the standardization algorithm may create standardized data entries that clearly indicate the relevant data for similar IT services/assets from multiple, different IT service providers 402a-n.

Accordingly, when the customer BMN 406 receives a data request from the customer infrastructure 404 for data associated with the customer's IT services/assets, the customer BMN 406 may quickly and accurately retrieve relevant data from the standardized IT services data files. The customer BMN 406 may analyze the data request from the customer infrastructure 404, and may determine that the customer is requesting data that is likely stored in one or more of the standardized IT services data files. The customer BMN 406 may then open the one or more standardized IT services data files, and may locate/retrieve the requested data. In this manner, the customer BMN 406 may also quickly search and retrieve requested data entries as a result of the data standardization streamlining the searching process.

In any event, the customer infrastructure 404 may generally include a customer host 404a and a domain controller 404b. The customer host 404a may generally be or include a host server or device (e.g., laptop, desktop, etc.) configured to run a set of executable instructions that may cause the processors of the host server or device to perform one or more actions of the methods described herein. The set of executable instructions may take the form of an application or computer program that the customer may access at any suitable time to perform one or more of the actions described herein. The domain controller 404b may generally include one or more active directories corresponding to employees and/or other authorized users of the customer. These active directories may be maintained by the customer as part of the customer infrastructure 404 during operations of the customer, such that activity statuses, permissions, and/or other account credentials for authorized users of the customer may change within the domain controller 404b upon execution of the set of executable instructions stored in the customer host 404a. The customer infrastructure 404 may also include other appliances and/or customer devices behind a firewall associated with the customer infrastructure 404.

Further, the network communication links 408, 410, 414 may correspond to communication links provided by the network 106 of FIG. 1 and the network 306 of FIG. 3. As illustrated in FIG. 4, the IT service provider region 402 may communicate with the customer BMN 406 across the network communication link 410, the customer infrastructure 404 may communicate with the customer BMN 406 across the network communication link 408, and the internal user device 412 may communicate with the customer BMN 406 across the network communication link 414. In this manner, the customer service region 402 may communicate with the customer infrastructure 404 and/or the internal user device 412 through the customer BMN 406.

Customers can modify the instructions stored on the computer host 402a in order to more effectively manage the particular configuration of preferences they have as part of their organization. For example, a first customer may have a first data sharing preference to not share data/information with any IT service providers 402a-n in the IT service provider region 402 unless explicitly approved through request, and a second customer may have a second data sharing preference to decrypt and share data only with IT service providers 402a-n with whom the second customer has an active relationship (e.g., an active IT asset and/or service contract). Moreover, customers may utilize the computer host 402a and/or the domain controller 404b to adjust/modify their active service contracts and/or to make requests regarding assets acquired from an IT service provider 402a-n. For example, a first customer may utilize the customer host 404a and/or the domain controller 404b to request repairs/replacement of a first IT asset purchased from the IT service provider A 402a.

Additionally, or alternatively, customers using the customer infrastructure 404 can run scripts included as part of the customer host 404a and/or the domain controller 404b in order to make updates as many times as is necessary and/or desirable. For example, a first customer may be a large organization and may need to update and/or request reports/updates to the active IT service contracts and/or assets multiple times per day, whereas a second customer may be a small organization that only updates and/or request reports/updates to the active IT service contracts and/or assets once a week. In either case, the customer may configure the instructions of the customer host 404a and/or domain controller 404b to accommodate the updating schedule/frequency as necessary to meet the needs of the customer.

It should be appreciated by those of skill in the art that in the examples discussed above, the IT service providers 402a-n and/or the internal user (e.g., via internal user device 412) associated with the customer BMN 406 may be well-positioned to provide additional assistance to the customer. In general, the techniques discussed above and herein allow IT service providers to deploy assets (e.g., VMs) into the customer's environment on an as-needed basis, and to be poised to provide additional services without any delay based on the preferences and data received from the customer infrastructure 404.

Example Method

Figure 5:
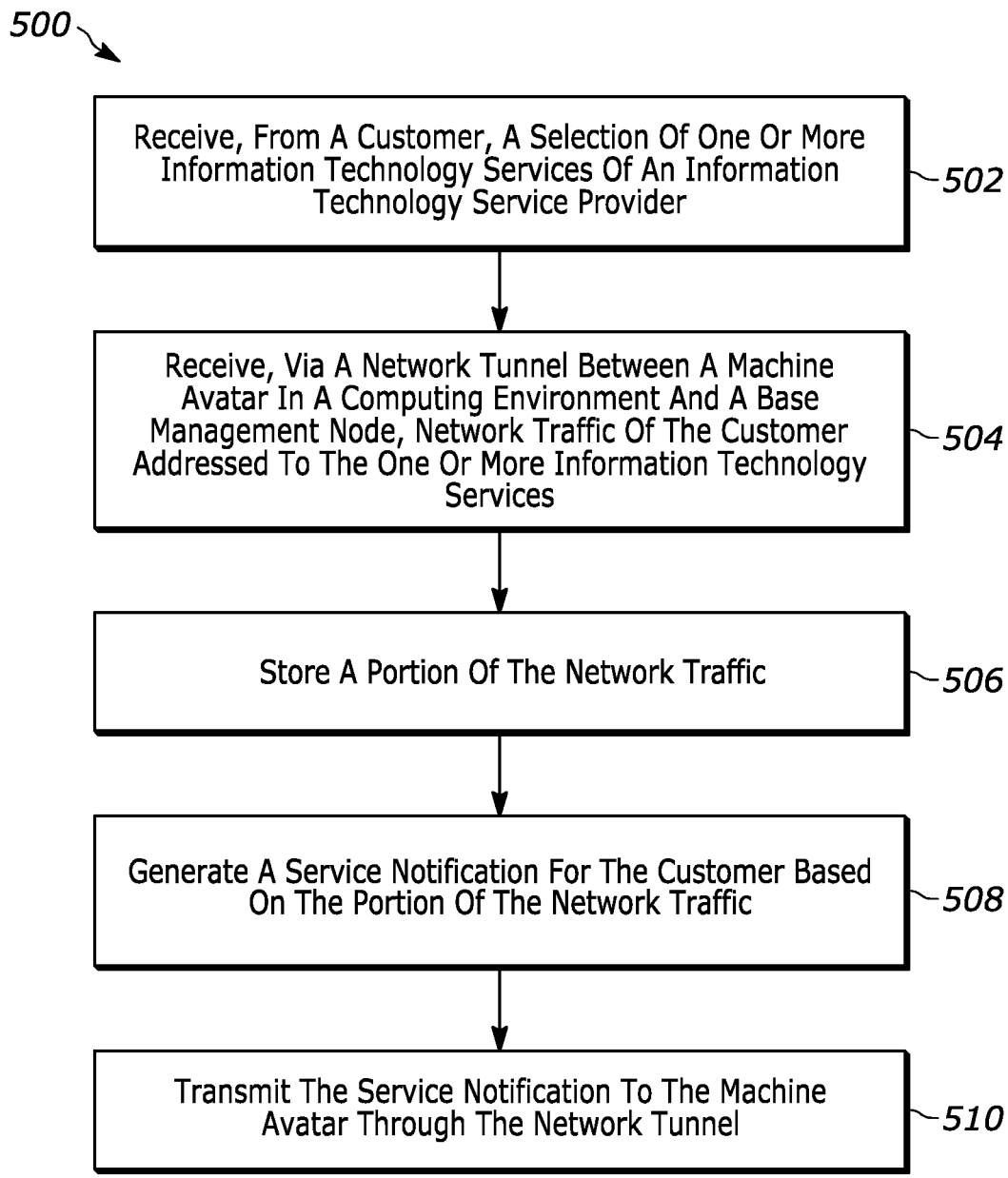
FIG. 5 is a block diagram of an exemplary method for intelligent collection and selective sharing of information technology asset inventory over a managed services platform, in accordance with various embodiments herein.

FIG. 5 is a block diagram of an exemplary method 500 for intelligent collection and selective sharing of information technology asset inventory over a managed services platform, in accordance with various embodiments herein. Generally speaking, the actions described herein in reference to FIG. 5 may be performed, in part or in whole, by any of the information technology service providers 402, the customer infrastructure 404, the BMN 406, and/or any other components described herein or combinations thereof. Further, it should be appreciated that any of the actions of the exemplary method 500 described herein may be performed any suitable number of times, in any suitable order, and/or may be optional in certain embodiments.

The method 500 may include receiving, from a customer, a selection of one or more information technology services of an information technology service provider (block 502). The method 500 may also include receiving, via a network tunnel between a machine avatar in a computing environment and a base management node, network traffic of the customer addressed to the one or more information technology services (block 504).

The method 500 may further include storing a portion of the network traffic (e.g., on the base management node 406 and/or an internal user device 412) (block 506). The method 500 may further include generating a service notification for the customer based on the portion of the network traffic (block 508). The method 500 may further include transmitting the service notification to the machine avatar through the network tunnel (block 510).

In certain embodiments, the method 500 may further include receiving, from the customer, a second selection of one or more sharing preferences for data corresponding to the one or more information technology services; and/or sharing the portion of the network traffic in accordance with the one or more sharing preferences. Further in these embodiments, the information technology service provider may be one of a plurality of information technology service providers. The method 500 may also further include determining, based on the second selection, that the customer authorizes sharing the data corresponding to the one or more information technology services with two or more information technology service providers of the plurality of information technology service providers; and/or sharing, by utilizing two or more application programming interfaces (APIs), the data corresponding to the one or more information technology services with the two or more information technology service providers. In these embodiments, each API of the two or more APIs may be associated with a respective information technology service provider of the two or more information technology service providers.

In some embodiments, the method 500 may further include encrypting, by executing an encryption algorithm, a portion of the network traffic; receiving a data request from the information technology service provider; determining that the portion of the network traffic should be shared with the information technology service provider based on the one or more sharing preferences; decrypting, by executing the encryption algorithm, the portion of the network traffic; and/or transmitting the portion of the network traffic to an information technology service provider.

In certain embodiments, the method 500 may further include receiving information technology services data from the information technology service provider; standardizing, by executing a standardization algorithm, the information technology services data; and/or storing the information technology services data into one or more standardized information technology services data files on the base management node. Further in these embodiments, the method 500 may further include receiving a data request from the customer across the network tunnel; determining, by executing the standardization algorithm, at least one of the one or more standardized information technology services data files referenced by the data request; and/or retrieving standardized information technology services data from the at least one of the one or more standardized information technology services data files.

In some embodiments, the method 500 may further include generating a proactive notification for the customer based on the portion of the network traffic. The proactive notification may have a timed transmission threshold. In these embodiments, the method 500 may further include, responsive to determining that the timed transmission threshold is satisfied, transmitting the proactive notification to the machine avatar through the network tunnel.

In certain embodiments, the method 500 may further include transmitting the service notification to an internal workstation; and/or connecting a user device associated with the computing environment to the internal workstation via the network tunnel.

In some embodiments, the method 500 may further include initializing the machine avatar in the computing environment by analyzing the one or more information technology services; establishing the network tunnel between the machine avatar and the base management node; receiving an information technology service provider information request from a user device associated with the computing environment; and transmitting, across the network tunnel, information technology services data indicating at least the one or more information technology services of the information technology service provider.

In certain embodiments, the method 500 may further include receiving a subscription request corresponding to a licensed asset; provisioning, based on the subscription request, an instance of the licensed asset; and/or providing, via the network tunnel, the customer with access to the instance of the licensed asset.

In some embodiments, the machine avatar of the customer may include a virtual machine, and the method 500 may further include generating the virtual machine and a virtual network interface corresponding to the machine avatar. Further in these embodiments, generating the virtual machine may include deploying the virtual machine in a cloud computing platform.

ADDITIONAL CONSIDERATIONS

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Although the following text sets forth a detailed description of numerous different embodiments, it should be understood that the legal scope of the description is defined by the words of the claims set forth at the end of this text. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

What is claimed:

1. A computer-implemented method for intelligent collection and selective sharing of information technology asset inventory over a managed services platform, comprising:
   receiving, from a customer, a selection of one or more information technology services of an information technology service provider;
   receiving, via a network tunnel between a machine avatar in a computing environment and a base management node, network traffic of the customer addressed to the one or more information technology services;
   storing, by one or more processors, a portion of the network traffic;
   generating, by the one or more processors, a service notification for the customer based on the portion of the network traffic; and
   transmitting, by the one or more processors, the service notification to the machine avatar through the network tunnel.

2. The computer-implemented method of claim 1, further comprising:
   receiving, from the customer, a second selection of one or more sharing preferences for data corresponding to the one or more information technology services; and
   sharing, by the one or more processors, the portion of the network traffic in accordance with the one or more sharing preferences.

3. The computer-implemented method of claim 2, wherein the information technology service provider is one of a plurality of information technology service providers, and the method further comprises:
   determining, by the one or more processors based on the second selection, that the customer authorizes sharing the data corresponding to the one or more information technology services with two or more information technology service providers of the plurality of information technology service providers; and
   sharing, by the one or more processors utilizing two or more application programming interfaces (APIs), the data corresponding to the one or more information technology services with the two or more information technology service providers, wherein each API of the two or more APIs is associated with a respective information technology service provider of the two or more information technology service providers.

4. The computer-implemented method of claim 1, further comprising:
   encrypting, by the one or more processors executing an encryption algorithm, the portion of the network traffic;
   receiving, at the one or more processors, a data request from the information technology service provider;
   determining, by the one or more processors, that the portion of the network traffic should be shared with the information technology service provider based on the one or more sharing preferences;
   decrypting, by the one or more processors executing the encryption algorithm, the portion of the network traffic; and
   transmitting, by the one or more processors, the portion of the network traffic to the information technology service provider.

5. The computer-implemented method of claim 1, further comprising:
   receiving, at the one or more processors, information technology services data from the information technology service provider;
   standardizing, by the one or more processors executing a standardization algorithm, the information technology services data; and
   storing, by the one or more processors, the information technology services data into one or more standardized information technology services data files on the base management node.

6. The computer-implemented method of claim 5, further comprising:

receiving, at the one or more processors, a data request from the customer across the network tunnel;

determining, by the one or more processors executing the standardization algorithm, at least one of the one or more standardized information technology services data files referenced by the data request; and retrieving, by the one or more processors, standardized information technology services data from the at least one of the one or more standardized information technology services data files.

7. The computer-implemented method of claim 1, further comprising:

generating, by the one or more processors, a proactive notification for the customer based on the portion of the network traffic, the proactive notification having a timed transmission threshold;

receiving, at the one or more processors, a response to the proactive notification;

responsive to determining that the timed transmission threshold is satisfied, storing, by the one or more processors, the response; and forwarding, by the one or more processors, the response to a corresponding information technology service provider.

8. The computer-implemented method of claim 1, further comprising:

transmitting, by the one or more processors, the service notification to an internal workstation; and connecting, by the one or more processors, a user device associated with the computing environment to the internal workstation via the network tunnel.

9. The computer-implemented method of claim 1, further comprising:

initializing, by the one or more processors, the machine avatar in the computing environment by analyzing the one or more information technology services;

establishing, by the one or more processors, the network tunnel between the machine avatar and the base management node;

receiving, by the one or more processors, an information technology service provider information request from a user device associated with the computing environment; and transmitting, by the one or more processors across the network tunnel, information technology services data indicating at least the one or more information technology services of the information technology service provider.

10. The computer-implemented method of claim 1, further comprising:

receiving, at the one or more processors, a subscription request corresponding to a licensed asset;

provisioning, by the one or more processors based on the subscription request, an instance of the licensed asset; and providing, via the network tunnel, the customer with access to the instance of the licensed asset.

11. The computer-implemented method of claim 1, wherein the machine avatar of the customer includes a virtual machine, and the method further comprises:

generating the virtual machine and a virtual network interface corresponding to the machine avatar, wherein generating the virtual machine includes deploying the virtual machine in a cloud computing platform.

12. A computing system comprising:

one or more processors; and a memory storing instructions that, when executed by the one or more processors, cause the computing system to:

receive, from a customer, a selection of one or more information technology services of an information technology service provider, receive, via a network tunnel between a machine avatar in a computing environment and a base management node, network traffic of the customer addressed to the one or more information technology services, store a portion of the network traffic, generate a service notification for the customer based on the portion of the network traffic, and transmit the service notification to the machine avatar through the network tunnel.

13. The computing system of claim 12, wherein the instructions, when executed, further cause the computing system to:

receive, from the customer, a second selection of one or more sharing preferences for data corresponding to the one or more information technology services; and share the portion of the network traffic in accordance with the one or more sharing preferences.

14. The computer system of claim 13, wherein the information technology service provider is one of a plurality of information technology service providers, and the instructions, when executed, further cause the computing system to:

determine, based on the second selection, that the customer authorizes sharing the data corresponding to the one or more information technology services with two or more information technology service providers of the plurality of information technology service providers; and share, by utilizing two or more application programming interfaces (APIs), the data corresponding to the one or more information technology services with the two or more information technology service providers, wherein each API of the two or more APIs is associated with a respective information technology service provider of the two or more information technology service providers.

15. The computing system of claim 12, wherein the instructions, when executed, further cause the computing system to:

encrypt, by executing an encryption algorithm, the portion of the network traffic;

receive a data request from the information technology service provider;

determine that the portion of the network traffic should be shared with the information technology service provider based on the one or more sharing preferences;

decrypt, by executing the encryption algorithm, the portion of the network traffic; and transmit the portion of the network traffic to the information technology service provider.

16. The computing system of claim 12, wherein the instructions, when executed, further cause the computing system to:

receive information technology services data from the information technology service provider;

standardize, by executing a standardization algorithm, the information technology services data;

store the information technology services data into one or more standardized information technology services data files on the base management node;

receive a data request from the customer across the network tunnel;

determine, by executing the standardization algorithm, at least one of the one or more standardized information technology services data files referenced by the data request; and retrieve standardized information technology services data from the at least one of the one or more standardized information technology services data files.

17. The computing system of claim 12, wherein the instructions, when executed, further cause the computing system to:

generate a proactive notification for the customer based on the portion of the network traffic, the proactive notification having a timed transmission threshold;

receive a response to the proactive notification;

responsive to determining that the timed transmission threshold is satisfied, store the response; and forward the response to a corresponding information technology service provider.

18. The computing system of claim 12, wherein the instructions, when executed, further cause the computing system to:

transmit the service notification to an internal workstation; and connect a user device associated with the computing environment to the internal workstation via the network tunnel.

19. The computing system of claim 12, wherein the instructions, when executed, further cause the computing system to:

initialize the machine avatar in the computing environment by analyzing the one or more information technology services;

establish the network tunnel between the machine avatar and the base management node;

receive an information technology service provider information request from a user device associated with the computing environment; and transmit, across the network tunnel, information technology services data indicating at least the one or more information technology services of the information technology service provider.

20. A non-transitory computer readable medium containing program instructions that when executed, cause a computer to:

receive, from a customer, a selection of one or more information technology services of an information technology service provider;

receive, via a network tunnel between a machine avatar in a computing environment and a base management node, network traffic of the customer addressed to the one or more information technology services;

store a portion of the network traffic;

generate a service notification for the customer based on the portion of the network traffic; and transmit the service notification to the machine avatar through the network tunnel.

* * * * *